United States Patent
Schlesinger et al.

(10) Patent No.: US 10,417,347 B2
(45) Date of Patent: *Sep. 17, 2019

(54) COMPUTER MESSAGING BOT CREATION

(71) Applicant: Microsoft Technology Licensing, LLC, Redmond, WA (US)

(72) Inventors: Benny Schlesinger, Ramat Hasharon (IL); Hen Fitoussi, Ramat Hasharon (IL); Avichai Cohen, Givat Shmuel (IL); Yuval Pinchas Borsutsky, Rishon le-zion (IL); Eldar Cohen, Tel Aviv (IL); William Ramsey, Redmond, WA (US); Delia Koren, Tel Aviv (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/188,753

(22) Filed: Nov. 13, 2018

(65) Prior Publication Data
US 2019/0079926 A1 Mar. 14, 2019

Related U.S. Application Data

(63) Continuation of application No. 15/181,749, filed on Jun. 14, 2016, now Pat. No. 10,162,817.

(51) Int. Cl.
*G06F 17/28* (2006.01)
*H04L 12/58* (2006.01)
(Continued)

(52) U.S. Cl.
CPC ........... *G06F 17/28* (2013.01); *G06F 8/34* (2013.01); *G06F 16/3344* (2019.01);
(Continued)

(58) Field of Classification Search
CPC ....... G10L 15/22; G10L 15/265; G06F 17/27; G06F 17/2785; G06F 17/28; G06F 17/289

See application file for complete search history.

(56) References Cited

U.S. PATENT DOCUMENTS

| 5,555,169 A * | 9/1996 | Namba ................. G06F 17/274 704/9 |
| 5,579,223 A * | 11/1996 | Raman .................... G06F 8/60 704/1 |

(Continued)

FOREIGN PATENT DOCUMENTS

JP 2000322245 A * 11/2000

*Primary Examiner* — Eric Yen
(74) *Attorney, Agent, or Firm* — Goff IP Law PLLC; Jared Goff

(57) ABSTRACT

Creation data can be received from a computer-readable developer profile, with the creation data including instructions to create a messaging bot. A messaging bot definition can be generated using the instructions, and a messaging bot may be executed using the definition. The instructions may include natural language instructions defining one or more messaging bot characteristics. The natural language instructions can be matched with one or more commands to include one or more characteristics in the messaging bot, and instructions for those characteristic(s) can be included in the messaging bot definition. The instructions can be instructions that are not in a computer programming language, and they can be instructions to create one or more general messaging bot characteristics configured to be implemented with a specific dialog structure that defines one or more specific natural language dialog scripts.

20 Claims, 10 Drawing Sheets

(51) Int. Cl.
*H04L 29/08* (2006.01)
*G10L 15/22* (2006.01)
*G10L 15/26* (2006.01)
*G06F 16/33* (2019.01)
*G06F 8/34* (2018.01)
*G06F 17/27* (2006.01)

(52) U.S. Cl.
CPC ........ *G06F 17/279* (2013.01); *G06F 17/2785* (2013.01); *G10L 15/22* (2013.01); *G10L 15/265* (2013.01); *H04L 51/02* (2013.01); *H04L 51/04* (2013.01); *H04L 67/02* (2013.01)

(56) References Cited

U.S. PATENT DOCUMENTS

| | | | |
|---|---|---|---|
| 5,640,576 A * | 6/1997 | Kobayashi | G06F 8/30 704/9 |
| 5,920,721 A * | 7/1999 | Hunter | G06F 8/47 717/146 |
| 6,314,410 B1 * | 11/2001 | Tackett | G06N 20/00 706/11 |
| 6,754,647 B1 * | 6/2004 | Tackett | G06F 17/279 700/246 |
| 7,039,654 B1 * | 5/2006 | Eder | G06Q 10/06 |
| 7,136,818 B1 * | 11/2006 | Cosatto | G10L 15/1807 704/275 |
| 9,275,641 B1 | 3/2016 | Gelfenbeyn et al. | |
| 9,865,260 B1 * | 1/2018 | Vuskovic | G06F 17/278 |
| 2005/0005266 A1 * | 1/2005 | Datig | G06F 17/279 717/136 |
| 2005/0071164 A1 * | 3/2005 | Mandalia | 704/270.1 |
| 2005/0125370 A1 * | 6/2005 | Brennan | G06F 16/90335 706/47 |
| 2007/0168480 A1 * | 7/2007 | Biggs | H04L 51/04 709/223 |
| 2010/0037147 A1 * | 2/2010 | Champion | G06F 21/316 715/751 |
| 2013/0332168 A1 * | 12/2013 | Kim | G06F 16/632 704/251 |
| 2014/0214399 A1 * | 7/2014 | Gulwani | G06F 17/246 704/8 |
| 2016/0147507 A1 * | 5/2016 | Cheng | G06F 8/35 717/104 |
| 2017/0180499 A1 * | 6/2017 | Gelfenbeyn | H04L 51/02 |
| 2017/0293834 A1 * | 10/2017 | Raison | G06N 3/006 |
| 2019/0189121 A1 | 6/2019 | Schlesinger et al. | |

* cited by examiner

BOT DIALOG DISPLAY 700

COMPUTER MESSAGING BOT CREATION

RELATED APPLICATIONS

The present application is a continuation of U.S. application Ser. No. 15/181,749, filed Jun. 14, 2016, and entitled "COMPUTER MESSAGING BOT CREATION," which is incorporated herein by reference. If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

BACKGROUND

A messaging bot (or messaging robot) is a configuration of computer hardware (e.g., dedicated hardware logic components and/or hardware configured with software) that, when it is run or executed, automatically interacts using a natural language dialog, which can include receiving natural language instructions, processing those instructions, and responding with natural language dialog scripts. A natural language is a language used in natural conversation between human beings, such as Mandarin Chinese, Spanish, English, Hindi, Arabic, Portuguese, Japanese, German, French, etc. Natural language can also include language modifications that are used in natural conversation between human beings in various different contexts, such as digital messaging conversations, in-person conversations, etc. For example, such modifications may include mixtures of formal languages, abbreviations, and/or slang.

Messaging bots have been developed using source code in computer programming languages. Some messaging bot frameworks have been provided, where underlying basic computer bot framework components are invoked by user input including the appropriate computer programming language commands in the computer code for a particular messaging bot being developed. For example, such components may include a speech-to-text component, a language understanding component, and a dialog management component. Thus, when the computer code for the particular bot is run (possibly after being compiled), the code can invoke the underlying messaging bot framework components to perform computer functions, such as converting audio speech to text, deriving meanings from text (language understanding), and managing specifics the dialog, which can include generating and sending natural language scripts in response to the derived meanings (dialog management).

SUMMARY

The tools and techniques discussed herein relate to aspects of the creation of messaging bots, such as generating a computer-readable messaging bot definition and/or executing a messaging bot using a messaging bot definition. For example, some aspects of the tools and techniques can relate to using a first messaging bot for receiving and processing natural language instructions to create a second messaging bot, and using those instructions to generate a definition of the second messaging bot. As another example, the tools and techniques can relate to receiving and processing instructions to create a messaging bot, where the instructions define general bot characteristics in a natural language, and may do so without the instructions being in a computer programming language.

In one aspect, the tools and techniques can include receiving computer-readable creation data from a computer-readable developer profile at a first messaging bot. The instructions to create the second messaging bot can include natural language instructions defining one or more messaging bot characteristics. The natural language instructions can be analyzed. The analyzing can include determining that the natural language instructions match one or more pre-defined commands to include the one or more messaging bot characteristics in the second messaging bot. A computer-readable definition of the second messaging bot can be generated using results of the analyzing of the natural language instructions. The generating of the definition can comprise including computer-readable instructions for the one or more characteristics in the definition, with the definition being configured to produce the one or more characteristics when the second messaging bot is executed using the definition.

In another aspect of the tools and techniques, computer-readable creation data can be received from a computer-readable developer profile (such as creation data provided through responses to a messaging bot and/or through a visual interface such as a website or an installed messaging bot creation application). The creation data can include instructions to create a messaging bot, with the instructions not being in a computer programming language, and with the instructions to create the messaging bot defining one or more general messaging bot characteristics configured to be implemented with a specific dialog structure that defines one or more specific natural language dialog scripts. A computer-readable definition of the messaging bot can be generated using the instructions to create the messaging bot. The messaging bot can be executed using the definition. The executing of the bot can include producing the one or more general characteristics, and the producing of the one or more general characteristics can include receiving one or more natural language instructions from a user profile and responding with the one or more specific natural language dialog scripts, as dictated by the specific dialog structure.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
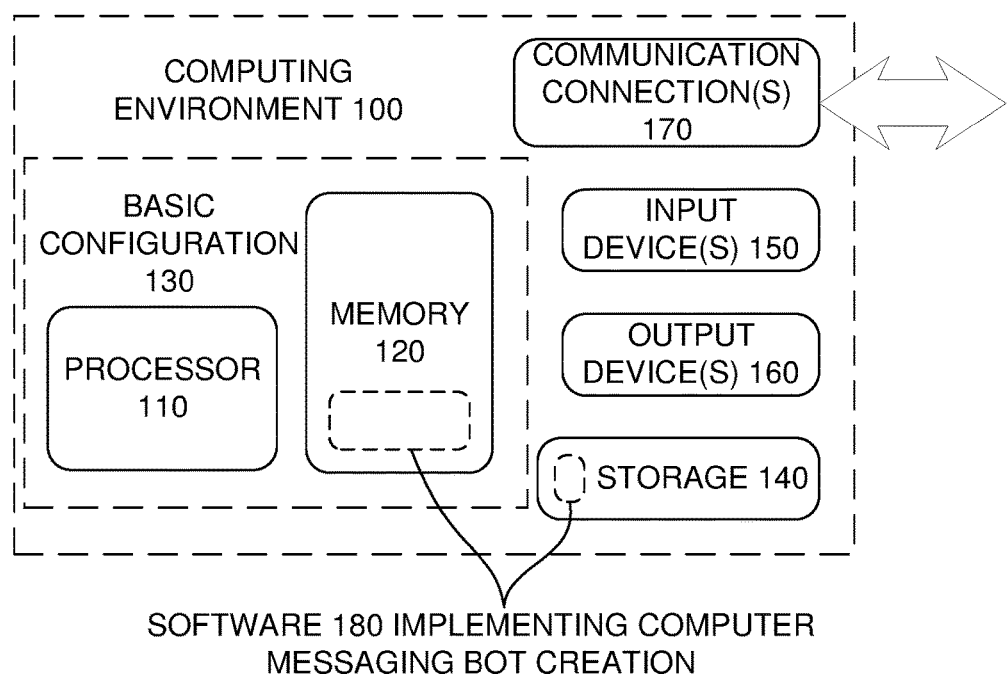
FIG. 1 is a block diagram of a suitable computing environment in which one or more of the described aspects may be implemented.

Aspects described herein are directed to techniques and tools for improved computer messaging bot creation. Such improvements may result from the use of various techniques and tools separately or in combination. For example, some such tools or techniques may encompass a portion of the bot creation process or system, an entire bot creation process or system, and/or running of a created bot in a bot runtime system.

Such techniques and tools may include creating a messaging bot without traditional user-input coding, such as by providing a visual interface (e.g., a Web page or visual application such as a mobile application) and/or a messaging bot through which bot creation instructions can be received from a developer profile and processed to generate a computer-readable definition of the messaging bot being developed. For example, messaging may be used to provide instructions to create a messaging bot, and a developer and users of the messaging bot can perform all interaction through messaging on one or more computing devices, such as mobile devices.

Previously, conversional bots have been created using computer code in one or more computer programming languages. Accordingly, the development of such bots typically requires a user with knowledge of the programming language(s), and computer programs and other computing resources devoted to providing assistance to users in writing code in the computer programming language(s) (help screens, tutorials, etc.), and in debugging the computer code. The present inventors have found that the messaging bot creation process in a computer system can be more efficient by processing instructions that are in natural language and/or that describe general characteristics of the messaging bot without being in the form of computer language code. By utilizing such instructions as discussed herein, the messaging bot computer system can provide technological advantages, such as speeding up the process of creating messaging bots, making the bot creation system more user-friendly (especially for users who are not well-versed in computer programming languages), and decreasing bugs and errors that are often introduced through user profiles inputting computer language coding to define messaging bots. Indeed, these tools and techniques for messaging bot creation may allow users without significant skills in computer programming languages to provide the input to create messaging bots, when such users would not otherwise be able to do so. Accordingly, a bot creation computer system can be improved using the tools and techniques discussed herein.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, the processor, memory, storage, output device(s), input device(s), and/or communication connections discussed below with reference to FIG. 1 can each be at least a portion of one or more hardware components. Dedicated hardware logic components can be constructed to implement at least a portion of one or more of the techniques described herein. For example and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

FIG. 1 illustrates a generalized example of a suitable computing environment 100 in which one or more of the described aspects may be implemented. For example, one or more such computing environments can be used as a client and/or server device in the messaging bot computer system discussed herein. Generally, various different computing system configurations can be used. Examples of well-known computing system configurations that may be suitable for use with the tools and techniques described herein include, but are not limited to, server farms and server clusters, personal computers, server computers, smart phones, laptop devices, slate devices, game consoles, multiprocessor systems, microprocessor-based systems, programmable consumer electronics, network PCs, minicomputers, mainframe computers, distributed computing environments that include any of the above systems or devices, and the like.

The computing environment 100 is not intended to suggest any limitation as to scope of use or functionality of the invention, as the present invention may be implemented in diverse types of computing environments.

With reference to FIG. 1, various illustrated hardware-based computer components will be discussed. As will be discussed, these hardware components may store and/or execute software. The computing environment 100 includes at least one processing unit or processor 110 and memory 120. In FIG. 1, this most basic configuration 130 is included within a dashed line. The processor 110 executes computer-executable instructions and may be a real or a virtual processor. In a multi-processing system, multiple processors execute computer-executable instructions to increase processing power. The memory 120 may be volatile memory (e.g., registers, cache, RAM), non-volatile memory (e.g., ROM, EEPROM, flash memory), or some combination of the two. The memory 120 stores software 180 implementing computer messaging bot creation. An implementation of computer messaging bot creation may involve all or part of the activities of the processor 110 and memory 120 being embodied in hardware logic as an alternative to or in addition to the software 180.

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component (e.g., if the display device includes a touch screen). Also, processors have memory. The inventors hereof recognize that such is the nature of the art and reiterate that the diagram of FIG. 1 is merely illustrative of an exemplary computing device that can be used in connection with one or more aspects of the technology discussed herein. Distinction is not made between such categories as "workstation," "server," "laptop," "handheld device," etc., as all are contemplated within the scope of FIG. 1 and reference to "computer," "computing environment," or "computing device."

A computing environment 100 may have additional features. In FIG. 1, the computing environment 100 includes storage 140, one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The memory 120 can include storage 140 (though they are depicted separately in FIG. 1 for convenience), which may be removable or non-removable, and may include computer-readable storage media such as flash drives, magnetic disks, magnetic tapes or cassettes, CD-ROMs, CD-RWs, DVDs, which can be used to store information and which can be accessed within the computing environment 100. The storage 140 stores instructions for the software 180.

The input device(s) 150 may be one or more of various different input devices. For example, the input device(s) 150 may include a user device such as a mouse, keyboard, trackball, etc. The input device(s) 150 may implement one or more natural user interface techniques, such as speech recognition, touch and stylus recognition, recognition of gestures in contact with the input device(s) 150 and adjacent to the input device(s) 150, recognition of air gestures, head and eye tracking, voice and speech recognition, sensing user brain activity (e.g., using EEG and related methods), and machine intelligence (e.g., using machine intelligence to understand user intentions and goals). As other examples, the input device(s) 150 may include a scanning device; a network adapter; a CD/DVD reader; or another device that provides input to the computing environment 100. The output device(s) 160 may be a display, printer, speaker, CD/DVD-writer, network adapter, or another device that provides output from the computing environment 100. The input device(s) 150 and output device(s) 160 may be incorporated in a single system or device, such as a touch screen or a virtual reality system.

The communication connection(s) 170 enable communication over a communication medium to another computing entity. Additionally, functionality of the components of the computing environment 100 may be implemented in a single computing machine or in multiple computing machines that are able to communicate over communication connections. Thus, the computing environment 100 may operate in a networked environment using logical connections to one or more remote computing devices, such as a handheld computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment 100, computer-readable storage media include memory 120, storage 140, and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various aspects. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Messaging Bot System

Figure 2:
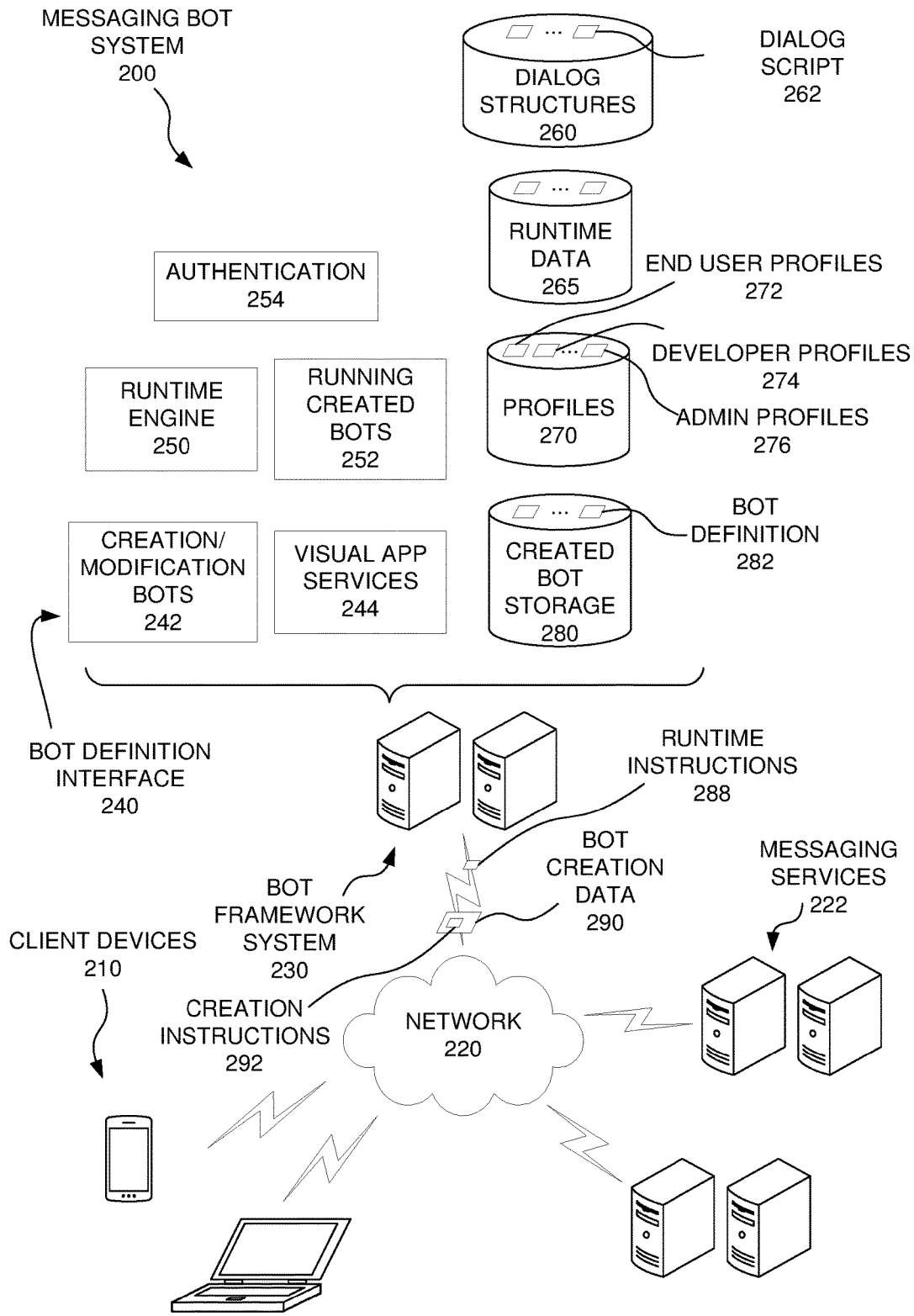
FIG. 2 is schematic diagram of a messaging bot computer system.

FIG. 2 is a block diagram of a messaging bot computer system 200 in conjunction with which one or more of the described aspects may be implemented.

Communications between the various devices and components discussed herein can be sent using computer system hardware, such as hardware within a single computing device, hardware in multiple computing devices, and/or computer network hardware. A communication or data item may be considered to be sent to a destination by a component if that component passes the communication or data item to the system in a manner that directs the system to route the item or communication to the destination, such as by including an appropriate identifier or address associated with the destination. Also, a data item may be sent in multiple ways, such as by directly sending the item or by sending a notification that includes an address or pointer for use by the receiver to access the data item. In addition, multiple requests may be sent by sending a single request that requests performance of multiple tasks.

Referring now to FIG. 2, components of the messaging bot system 200 will be discussed. Each of the components of FIG. 2 and other figures discussed herein includes hardware, and may also include software. For example, a component of FIG. 2 can be implemented entirely in computer hardware, such as in a system on a chip configuration. Alternatively, a component can be implemented in computer hardware that is configured according to computer software and running the computer software. The components can be distributed across computing machines or grouped into a single computing machine in various different ways. For example, a single component may be distributed across multiple different computing machines (e.g., with some of the operations of the component being performed on one or more client computing devices and other operations of the component being performed on one or more machines of a server).

A. Overview of Messaging Bot System Components

An overview of the messaging bot system components will now be provided, followed by more detailed discussions of some of the components. The messaging bot computer system 200 can include client devices 210, which can include any of a variety of different types of computing devices, such as desktop computers, laptops, smartphones, wearable devices, etc. The client devices 210 can each be connected to a computer network 220, which may include multiple private and/or public networks within the computer network 220, such as mobile device service networks, the Internet, dedicated computer communication lines, private local area networks, etc. The client devices 210 can interact with computer messaging services 222 over the network 220. For example, such services may provide audio and/or text-based messaging services. Such messaging services may be included within other services, such as messaging services within social network computer services, etc. The messaging services 222 can include multiple different types of messaging services 222.

The messaging services 222 and/or the client devices 210 can also communicate over the computer network 220 with a messaging bot framework computer system 230. The bot framework system 230 can include features for creating messaging bots and features for running messaging bots. Such features may be closely integrated, or they may be separated into different systems, such as a messaging bot development computer system and a messaging bot runtime computer system. The bot framework system 230 can include multiple components. For example, the bot framework system 230 can include a bot definition interface 240 that provides an interface to facilitate defining a messaging bot to be created and/or modified via the client devices 210. For example, the bot definition interface may include a creation/modification messaging bot 242 and/or a visual application service 244, such as a Web server or mobile application server. Each client device 210 can run one or more applications that is configured to interact with a creation/modification messaging bot 242 and/or a visual application service 244 (possibly via a messaging service 222), such as a Web browser, a text messaging application, and/or other application.

The bot framework system 230 can also include a runtime engine 250, which can participate in running created bots 252, which may have been created using the bot framework system. The runtime engine 250 may also run one or more creation/modification bots 242 that can participate in defining bots to be created. Additionally, the bot framework system 230 can include an authentication component 254, which can authenticate profiles, such as by verifying that proper credentials (usernames, passwords, certificates, keys, etc.) are provided from the client device 210 for the authenticated profile, and possibly from a messaging service 222 through which the client device 210 is interacting with the bot framework system 230.

The bot framework system 230 can include storage of computer-readable data that can be accessed, used, and/or modified by the running components of the bot framework system 230, such as the bot definition interface 240, the runtime engine 250, and/or the running created bots 252. For example, the storage may include dialog structures 260, which can include dialog scripts 262 for the running bots. The dialog scripts 262 can include data representing natural language to be used in natural language messaging dialog scripts sent from the bot framework system 230 to the client devices 210. The dialog structure 260 may also include additional data, such as audio clips for voiced messaging bots, rules that map particular received commands to particular scripts or other particular responses to particular received instructions, rules to govern the learning and use of learned dialog scripts for artificially intelligent messaging bots, etc. Also, the dialog structure 260 may include dialog scripts 262 for different languages, different dialects, different accents, different personalities, different ages, etc.

The storage in the bot framework system 230 can also include runtime data 265, which can include status data for use at runtime when running messaging bots in the bot framework system 230. For example, the runtime data 265 may include data representing orders made during a bot messaging session, information data representing payments made during a bot messaging session, and/or other data used by the bot framework system 230 when running the created bots 252, the creation/modification bots 242, and/or the visual application services 244.

The storage can also include profiles 270, which may include profiles having permissions to perform in one or more roles. For example, the profiles 270 can include end user profiles 272 (which may represent a single user or a group of users, or other entity) that can interact with the running created bots 252, developer profiles 274 that can provide instructions to create new messaging bots through the bot definition interface 240, and/or administrator profiles 276 that can interact with the bot framework system 230 to manage messaging bots that are already created. The bot framework system 230 can support multiple different roles for computer-readable profiles 270 (such as user profiles).

As used herein, actions may be discussed as being performed by such profiles 270 or to such profiles 270. This means that the actions are performed by or to a computer system where the profile 270 is active, such as a computer system environment where the profile is logged in using proper credentials. As examples of the profiles, a developer profile can define the messaging bot to be created, such as by providing instructions to create the messaging bot. Such instructions may include data indicating characteristics of the messaging bot, such as the bot's name, supported actions, content to be provided by the bot (e.g., digital images, digital videos, digital audio clips, etc.), or other personalized characteristics of the bot (a language, dialect, or accent for the bot; a general personality for the bot; etc.). As another example of a profile having a role, an administrator profile can manage the bot after it is created, such as managing the bot at runtime, examining usage statistics, and/or handling incoming orders supplied by the bot. As another example, an end user profile can interact with the bot in order to access data and/or obtain a service by interacting with the messaging bot using natural language.

The profiles 270 and/or other data in the messaging bot system 200 can include sensitive information such as certain personal information of users represented by the profiles 270. The messaging bot system 200 can include tools and techniques to protect such information. For example, the messaging bot system 200 may send some such information in encrypted form and/or use non-public communication channels. Additionally, at least some such data may be stored in encrypted form, and access to such data may be limited. For example, access may be limited only to profiles 270 with sufficient privileges that need access to the information, or whose information it is. Also, the messaging bot system 200 may employ opt-in and/or opt-out techniques to obtain permission from appropriate parties before storing or otherwise using or obtaining their information. Additional protections for privacy and/or security may also be utilized in the messaging bot system 200.

The storage can also include created bot storage 280, which can include bot definitions 282, which define characteristics of particular bots that have been created. For example, such characteristics may include the type of bot, general topics upon which the bot can converse, and particular information to be inserted in dialog scripts 262 for the particular bot at runtime. The bot definitions 282 may take any of various forms. For example, each bot definition may be a data structure that includes raw metadata representing characteristics of the created bot, with that metadata being accessible by the runtime engine 250 when running the bot at runtime. For example, the metadata could be included in JavaScript Object Notation (JSON) files, extensible markup language (XML) files, database tables, or other data structures. As another example, a bot definition 282 may include computer code to implement selected characteristics of the particular bot. For example, when generating the bot definition 282, the bot framework system 230 may produce such computer code, such as source code, object code, and/or scripting language code. For example, this may be done by mapping representations of the bot definition characteristics to pre-defined computer language code excerpts and/or inserting terms for the characteristics into pre-defined computer language code excerpts.

B. Runtime Engine Details

Additional details of the runtime engine 250 will now be discussed. As discussed above, the runtime engine 250 can run created bots 252, which can include receiving runtime instructions 288 from the client devices 210, and responding by processing those instructions according to the bot definition 282 (such as by identifying an appropriate responsive dialog script 262 and/or entering metadata into the runtime data 265). The runtime engine 250 may also respond by sending one or more responsive dialog scripts 262 back to the client device 210. The runtime instructions 288 and/or the responsive dialog scripts 262 may be sent between the bot framework system 230 and the client device 210 via a messaging service 222. For example, the client device 210 may communicate with one or more front end servers for the messaging service 222, and the bot framework system may communicate with one or more backend servers for the messaging service 222, with the end user profile 272 and the bot framework system 230 both being registered and authenticated with the messaging service 222. Communications between the creation/modification bots 242 and the client devices 210 may also be routed through the messaging services 222 in a similar manner.

Figure 3:
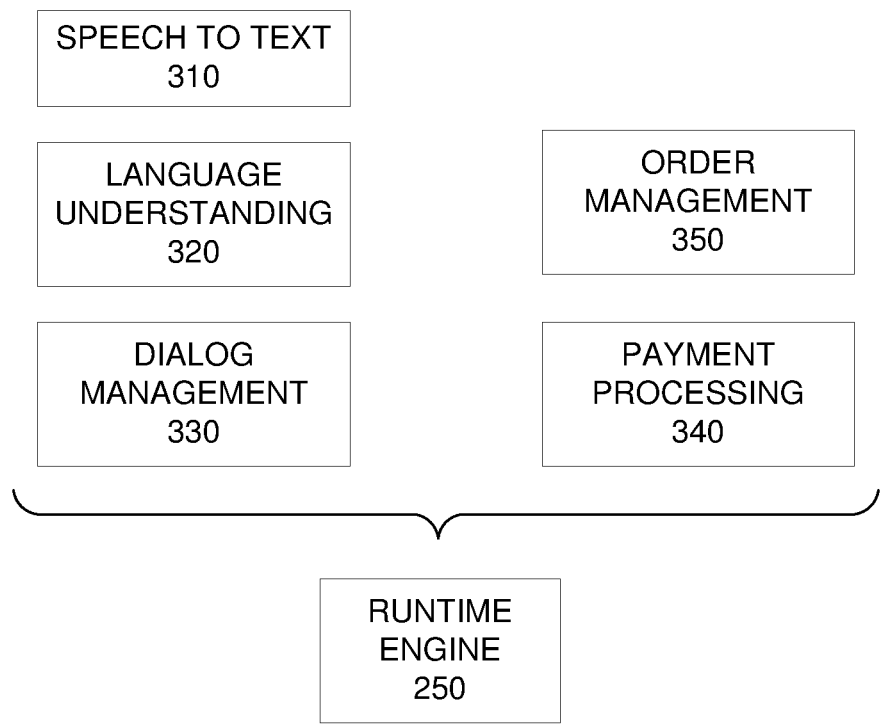
FIG. 3 is a block diagram of components of a runtime engine from the messaging bot computer system of FIG. 2.

Referring to FIGS. 2-3, the runtime engine 250 may include multiple components, which may each be integrated one or more other components or provided separately. Such components can be used for multiple different created bots having different characteristics. In some implementations, the runtime engine may include additional components and/or may omit one or more of the components discussed below. In this example, the runtime engine 250 includes a speech-to-text component 310, which can convert received coded audio speech in runtime instructions 288 and creation instructions 292 from coded audio speech data to data representing text.

The speech-to-text component 310 may use one or more existing speech-to-text processes, and may even invoke an existing speech-to-text engine by passing the speech to the existing speech-to-text engine and receiving results from the engine. For example, the speech-to-text component may utilize an existing overall process such as a Hidden-Markov Model-based process, a dynamic time warping process, or a neural network process. The speech-to-text component 310 may also use one or more performance improving techniques, such as context dependency; cepstral normalization; vocal tract length normalization; maximum likelihood linear regression; delta and delta-delta coefficients; heteroscedastic linear discriminant analysis (LDA); splicing and an LDA-based projection followed by heteroscedastic linear discriminant analysis or a global semi-tied co-variance transform; discriminative training techniques; and/or other speech-to-text performance enhancing techniques.

Data representing text of natural language instructions (whether received as text or produced by the speech-to-text component 310) can be provided to a language understanding component 320. The language understanding component 320 can analyze the natural language text, such as by disassembling and parsing the text and mapping the text to one or more commands that can be executed in response to the natural language instructions, such as by passing the command(s) to one or more of the following components: a dialog management component 330, an order management component 350, and a payment processing component 340. A pre-existing language understanding component 320 may be invoked by passing the natural language text to the pre-existing component with a request to return results representing the meaning(s) of the natural language text. The language understanding component 320 may include one or more known components for natural language understanding. For example, the language understanding component may utilize a lexicon of the natural language, as well as a parser and grammar rules to break each natural language phrase into a data representation of the phrase. The language understanding component 320 may also utilize a semantic theory to guide comprehension, such as a theory based on naïve semantics, stochastic semantic analysis, and/or pragmatics to derive meaning from context. Also, the language understanding component 320 may incorporate logical inference techniques by mapping a derived meaning into a set of assertions in predicate logic, and then using logical deduction to arrive at conclusions as to the meaning of the text. Using results of such language understanding techniques, the language understanding component 320 can map the resulting derived meanings to one or more commands to be passed to one or more other components, as discussed above.

The dialog management component 330 can manage the dialog structures 260, such as by making updates to the dialog scripts 262. Thus, dialog scripts 262 may change for a created bot, without changing the bot definition 282. For example, changes to a dialog script 262 can result in changed dialog scripts for multiple different existing created bots, without changing the bot definitions 282 for those created bots, because the runtime engine 250 can invoke the bot definition 282 to define which sets of dialog scripts 262 to use for that bot, but can rely on the system's dialog scripts 262 for providing the scripts themselves. Each such script 262 may be utilized by multiple different created bots. The dialog management component 330 can also receive commands from the language understanding component 320, and can provide dialog scripts 262 that are appropriate responses to the received commands derived from natural language runtime instructions 288 or creation instructions 292 by the language understanding component 320. Those dialog scripts 262 can be sent back to the interacting profile 270, from which the instructions were received, at an appropriate client device 210 for the profile 270.

The order management component 350 can manage orders received from profiles 270. For example, the order management component 350 can receive commands from the language understanding component 320, and can populate digital orders. The order management component 350 may also forward such orders to an administrative profile 276. For example, if the runtime instructions 288 include an order for a pizza, as determined by the language understanding component 320, the order processing component can populate a digital order template to produce a digital order, and can forward the digital order to an appropriate administrator profile 276 at a client device 210 for fulfilling the order.

The payment processing component 340 can process payments. For example, the runtime instructions 288 may include payment information, such as credit card information and a request to make the payment with the credit card. In response to such a request, the payment processing component 340 can process the payment, such as by communicating with server computers for a credit card company or other payment processing entity over the network 220.

The runtime engine 250 may include other components in addition to or instead of the components of FIG. 3. For example, the runtime engine could include a mapping component for providing directions or other mapping features. Also, if the running created bots 252 will not include ordering or payment processing features, then such components may be omitted from the runtime engine 250.

C. Bot Definition Interface Details

Referring to FIG. 2, the bot definition interface 240 will be discussed in more detail. The bot definition interface 240 can process the received bot creation data 290, and can populate a bot definition 282 in the created bot storage 280. The bot definition interface 240 may also trigger translation of the bot definition 282, such as translation to produce computer code in the form of scripted computer language, source code, or object code to serve as the bot definition 282. In such instances, the bot definition 282 may include the data in its pre-translated form in addition to the post-translated form. Thus, when changes are made to the bot definition 282, such updates may be made to the pre-translated form of the bot definition 282. The updated pre-translated form of the bot definition 282 can be translated into a post-translated form of the updated bot definition 282. Also, the translation may occur prior to runtime, or at runtime to produce the running created bot 252. In other implementations, the bot definition 282 may not be translated into a computer programming language, but may be accessed at runtime by a general bot, so that such a general bot that is configured to access the bot definition 282 and the bot definition 282 itself together form the running created bot 252.

The visual application services 244 will now be discussed, followed by a discussion of the creation/modification bots 242. The visual application services 244 can include one or more different types of application services. For example, the visual application services 244 may include a Web server, which can serve Web pages to the client devices 210, and can receive bot creation data 290 from the client devices 210. For example, the bot creation data 290 can include instructions 292 to create a particular messaging bot definition 282. The instructions 292 may be in the form of user input provided in the form of selections of options on displayed pages on a client device 210, text input on the displayed pages, coded audio and/or video from user input at the client devices 210 while interacting with visual applications on the client devices 210, and so forth.

The instructions 292 can define general characteristics for the bot being created, without defining particular dialog scripts, and without including user-input computer programming language code. In some instances, the bot creation data 290 may include some instructions that define particular dialog scripts, and other instructions 292 that define bot characteristics without defining particular dialog scripts for those characteristics. For example, the bot definition interface 240 may provide options to select pre-defined bot characteristics, and may also provide options for developer profiles 274 to create new characteristics, and to define possible instructions from the end user profiles 272 for those new characteristics, and the responsive dialog scripts for those new characteristics, as well as additional operations to be provided on the instructions (such as including a particular entry in an order upon receiving a particular instruction for an order).

1. Visual Application Services Bot Definition Example

Figure 4:
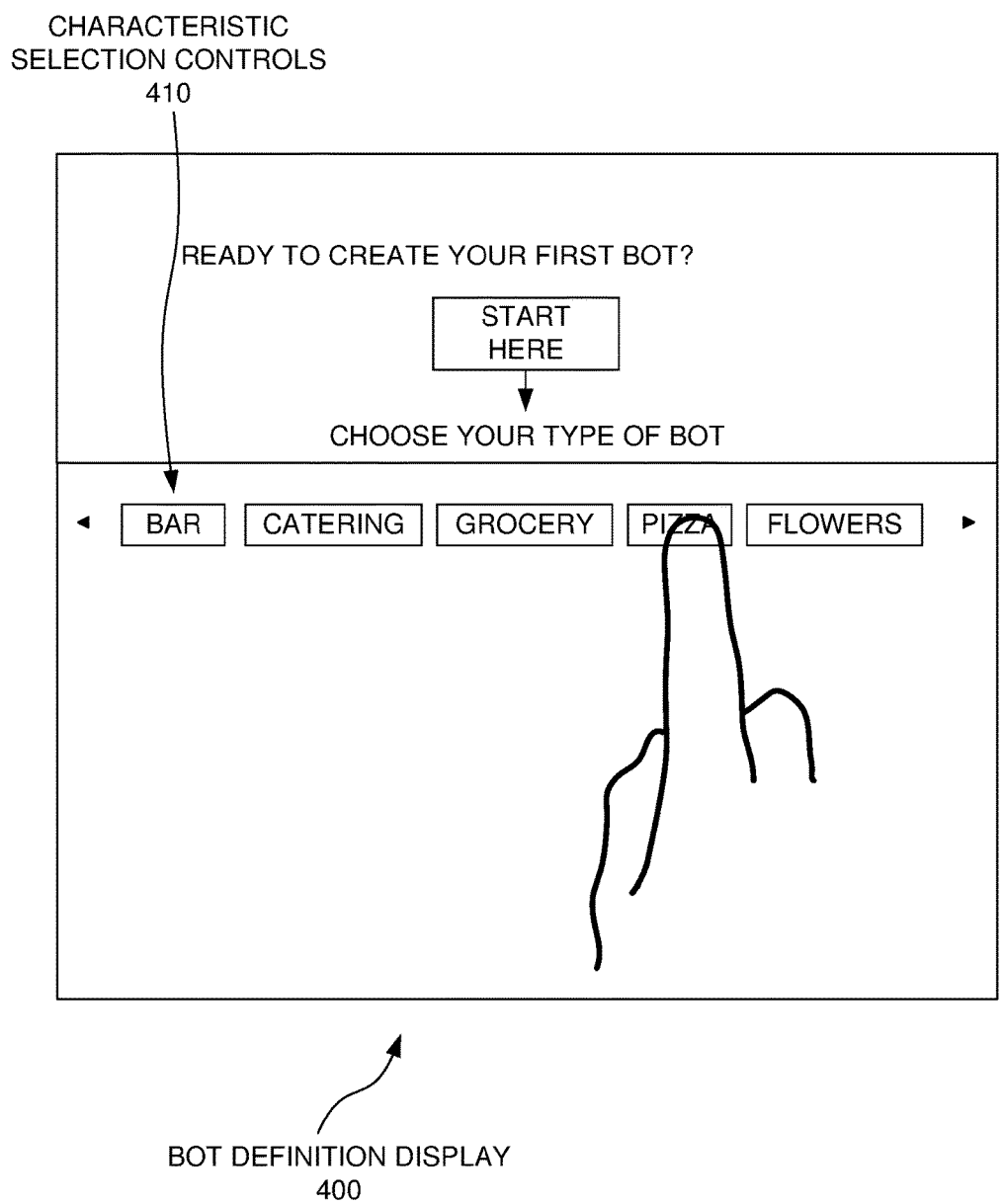
FIGS. 4-6 are illustrations of a bot definition display.
Figure 5:
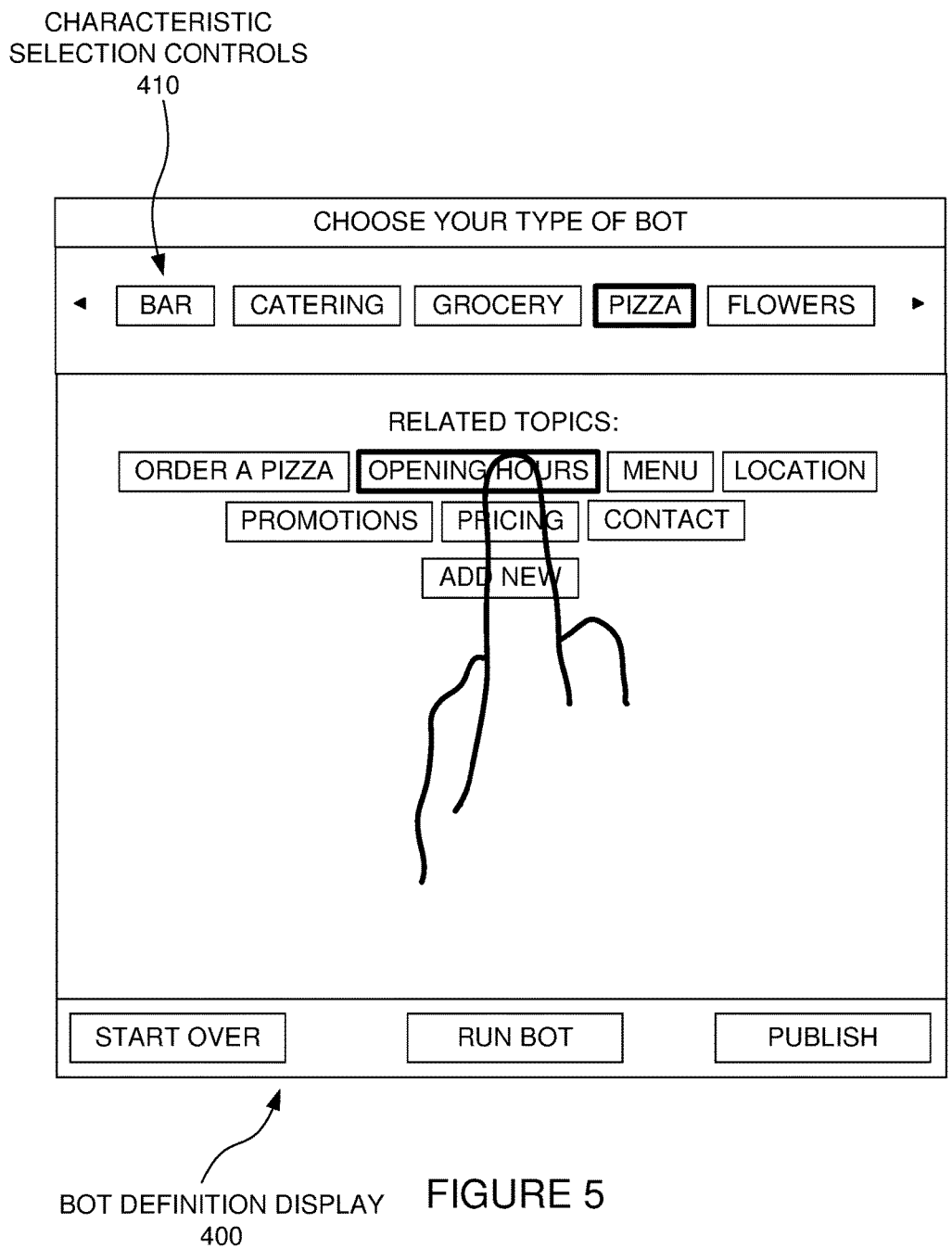
Figure 6:
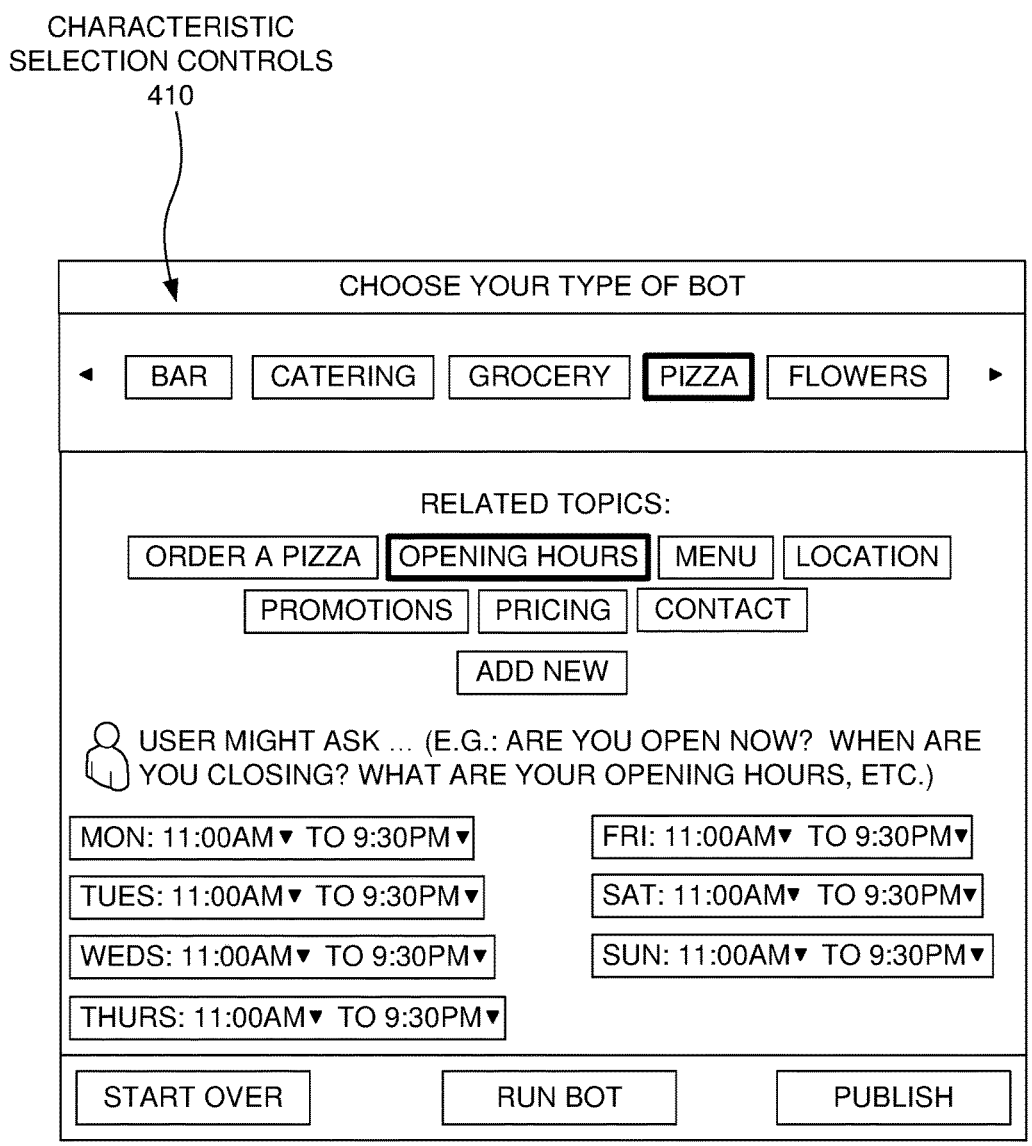

Referring now to FIGS. 4-6, an example of visual features for defining a messaging bot using the visual application services 244 of the bot framework system 230 will be discussed. Referring to FIG. 4, a bot definition display 400 is illustrated. The display 400 can be provided by the visual application services 244 to a client device 210, and the display 400 can be presented on display of a client device 210. Additionally, input directed at controls on the display 400 (such as a touch input, a mouse click, or a non-touch gesture) can be processed by the client device 210 and forwarded as runtime instructions 288 to the bot framework system 230.

The bot definition display 400 can include descriptive text and/or graphics (such as "Ready to create your first bot? Choose Your Type of Bot."). Additionally, the display 400 can include graphically displayed controls 410. For example, in FIG. 4, the bot definition display 400 includes controls in the form of buttons, which can be selected by user input directed at the buttons, to choose a type of bot. In this particular example, the types of bots happen to correspond to types of businesses (BAR, CATERING, GROCERY, PIZZA, FLOWERS), but the types of bots may not be related to businesses in some examples (a personal storytelling bot, a joke-telling bot, etc.). The example of FIG. 4 illustrates a touch selection of a PIZZA button from the characteristic selection controls 410, producing the display illustrated in FIG. 5.

The display of FIG. 5 illustrates additional characteristic selection controls 410 provided by the computer system on the display 400 in response to the user input selecting the PIZZA button. The additional characteristic controls 410 are related to the type of messaging bot that was selected, with the controls relating to topics for a messaging bot for a pizza restaurant (ORDER A PIZZA, OPENING HOURS, MENU, LOCATION, PROMOTIONS, PRICING, CONTACT). The display in FIG. 5 also includes a START OVER button, which can be selected by user input to discard the current bot data and start over to define a new messaging bot. The display 400 further includes a RUN BOT button, which can be selected to run the bot with the characteristics that have currently been selected. The running of the bot in response to selection of the RUN BOT control can result in the bot running using the runtime engine 250 and the dialog structures 260, resulting in a dialog that mimics a dialog that will be encountered by end user profiles 272 after the bot is created. Also, the display 400 can include a PUBLISH button (which could alternatively be a CREATE BOT button, a FINISH button, or some other text to indicate the bot is ready for use), which can deploy the resulting created bot for use by end users. The deploying may include saving a resulting bot definition 282 in the created bot storage 280. The system may have already saved the bot definition 282 in the created bot storage 280 in real time as changes were made in response to user input. The system can also respond to selection of the PUBLISH button by translating the bot definition 282 to another form, such as by compiling executable computer code from the bot definition 282. The selection of the PUBLISH button can also publish the resulting messaging bot so that it can be found by users (such as by users performing online searches, providing a specified link, asking for the messaging bot from another messaging bot, etc.).

In the example of FIGS. 4-6, the OPENING HOURS button on the display 400 is selected by user input, with the computer system responding by adding the additional controls illustrated in FIG. 5, related to the hours in which the pizza store will be open. User input can be provided to manipulate controls on the display 400 to specify the hours for each day of the week when the pizza restaurant will be open.

The display can also include an ADD NEW button, which can be selected to allow user input to add a new topic, which can include user input specifying particular dialog scripts for the new topic, and possibly including other responses to instructions provided in that topic. In addition to adding a topic, a button may be provided to add an argument to an existing topic. For example, a pizza order topic could include a dialog with the user to get the following arguments: Size (multiple choice of: small, medium, and large) and Toppings (multiple choice of: mushrooms, olives, pepperoni, peppers, pineapples). User input can be provided to instruct the system to edit these arguments (e.g. remove olives and add artichoke) or to add a whole new argument, such as Pizza Shape (multiple choice of: rectangle and round). When the system begins to define a new bot, the system can provide an associated template for each topic as part of the bot being defined (for all of a default set of topics prior to any modifying user input being provided to select the topics, or with just the populated templates for topics that have already been selected. Such templates can be used as a starting point in defining the bot. Thus, for example, if user input instructions from a developer profile selects "ORDER A PIZZA" as a topic to be modified, a pre-populated template can be provided prior to user input being provided on that topic. This can allow user input from a developer profile to select the RUN BOT button quickly to experience the bot in action without requiring much editing from the developer profile prior to running the bot.

Figure 7:
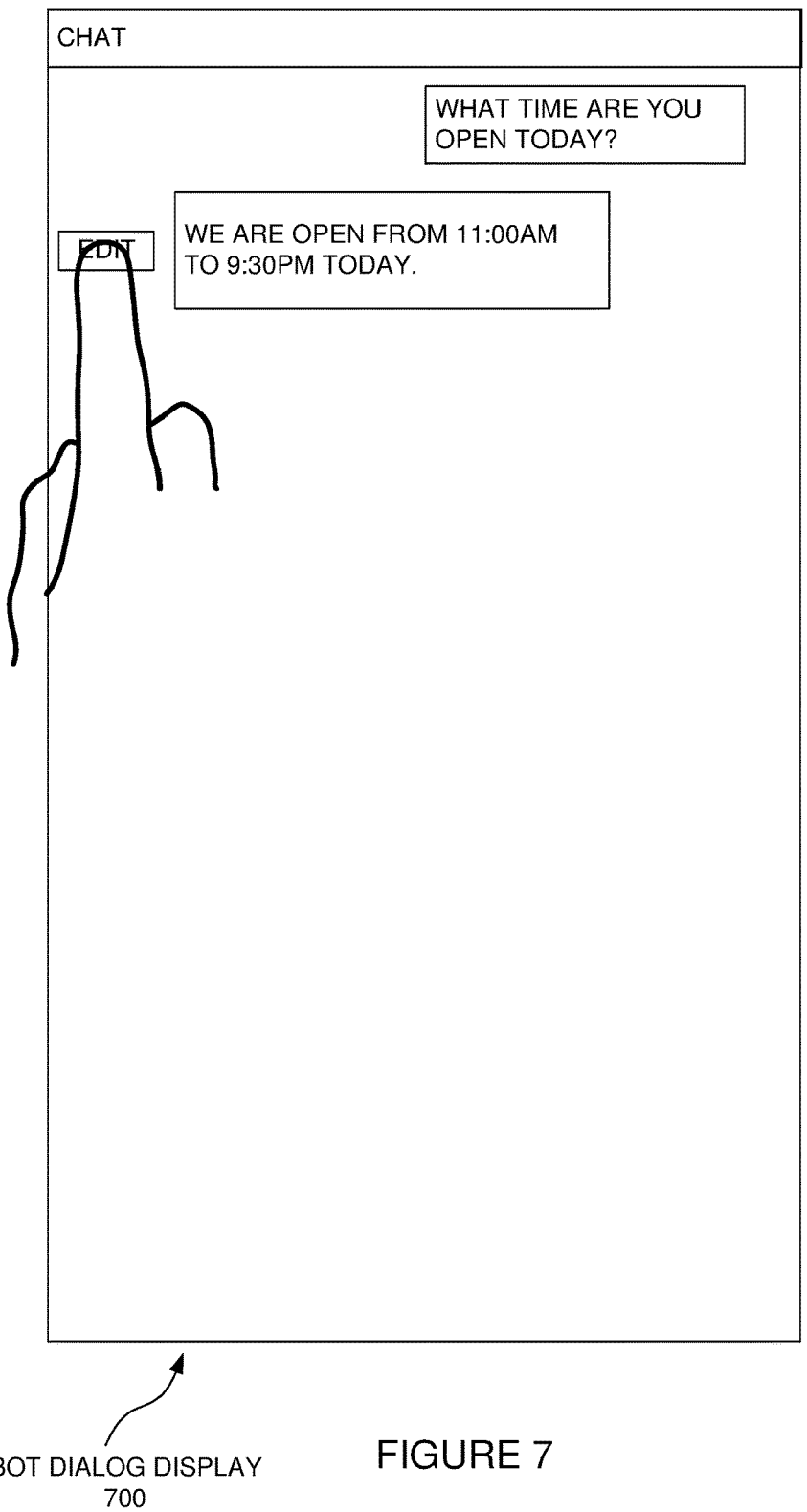
FIGS. 7-8 are illustrations of a bot dialog display.
Figure 8:
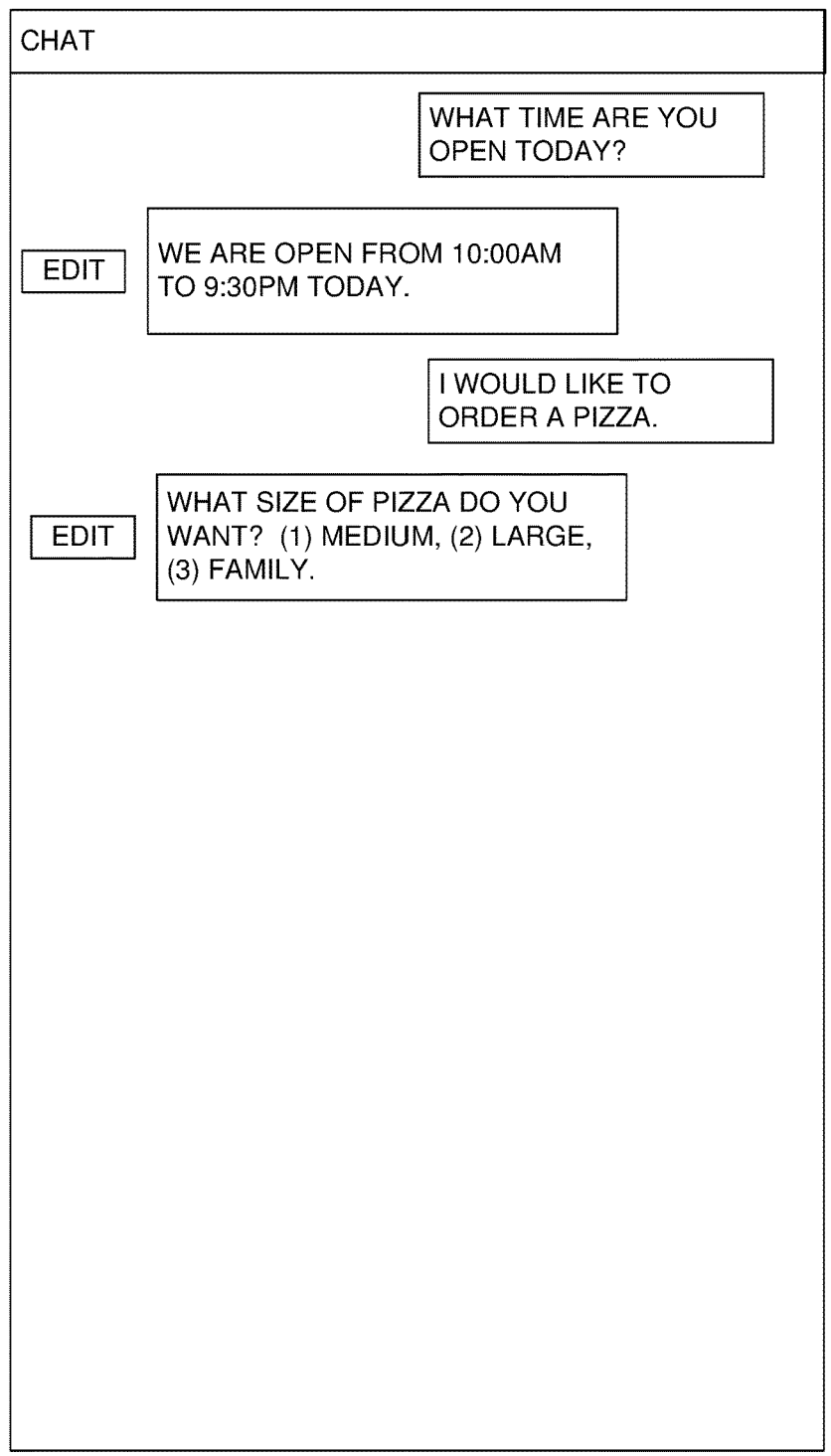

If the user input selects the RUN BOT control while defining the bot, the messaging bot can be run as a running created bot 252 by the runtime engine 250, with the running created bot 252 interacting with the developer profile 274 that is providing bot creation data 290 from a client device 210. An example is illustrated in FIGS. 7-8. Referring to FIG. 7, a bot dialog display 700 is illustrated in the form of a chat session interacting between the messaging bot and the developer profile 274. The bot dialog display 700 can appear and interact in the same manner as a running created bot 252 will run for an end user profile 272. However, with the developer profile 274 interacting, the bot framework system 230 can recognize that the developer profile has permission to edit the bot definition 282 for the running created bot 252. Accordingly, bot dialog display 700 can include an EDIT button that can be selected to edit the bot definition 282. That EDIT button can be omitted when the bot is being run by a profile without permission to edit the bot.

In response to user input selecting the EDIT button, the visual application services 244 can serve the bot definition display 400 of FIG. 6 to the developer profile 274 at a client device 210, allowing the developer profile 274 to provide input to edit the bot definition 282. For example, in FIG. 7, the chat session in the bot dialog display 700 reads, from the developer profile 274, "WHAT TIME ARE YOU OPEN TODAY?", and a response from the bot framework system 230 stating, "WE ARE OPEN FROM 11:00 AM TO 9:30 PM TODAY." The developer profile 274 can select the EDIT button of FIG. 7. In response, the bot framework system 230 can save the current chat between the developer profile 274 and the running created messaging bot 252, and can send to the developer profile 274 the display 400 of FIG. 6. The developer profile 274 can modify the open time for today using the characteristic selection controls 410 of the bot definition display 400 of FIG. 6, such as by changing the opening time from 11:00 AM to 10:00 AM for the current day, resulting in corresponding instructions being sent to the bot framework system 230. If the developer profile 274 then selects the RUN BOT button again, then the bot framework system 230 can respond by automatically re-running the chat to the point where it was when the EDIT button was selected. However, as illustrated in FIG. 8, this re-run chat can include changes from the editing. Accordingly, instead of the response from the bot framework system 230 stating, "WE ARE OPEN FROM 11:00 AM TO 9:30 PM TODAY," it can state, "WE ARE OPEN FROM 10:00 AM TO 9:30 PM TODAY." As illustrated in FIG. 8, the dialog between the developer profile 274 and the messaging bot being developed in the bot framework system 230 can continue, with the developer profile 274 and the bot framework system 230 providing the response, "WHAT SIZE OF PIZZA DO YOU WANT? (1) MEDIUM, (2) LARGE, (3) FAMILY." The developer profile 274 may then continue interacting with the running created messaging bot 252, or can select EDIT to re-enter the editing/creation environment (e.g., as illustrated in FIGS. 4-6) for defining the bot definition 282 for the bot being developed.

The example discussed above of running the bot may be altered in different examples. For example, a bot dialog display that displays a dialog with a running created bot could include displayed controls (such as displayed buttons) to be selected instead of or in addition to the current options to either enter a number or provide natural language text for an option. Thus, for example, for the pizza size, the large size above could be selected by user input stating "large", or by user input stating "2", or by user input selecting a button that reads "LARGE". Of course, other variations in user input could also be provided.

Also, additional enhancements may be provided for the bots at runtime. As an example, the runtime data 265 discussed above with respect to FIG. 2 may store data for a user between different sessions. Such historical runtime data may be used to expedite future interactions with the same profile, such as by remembering the last order or frequent orders. For, example, after receiving runtime instructions stating, "I would like to order a pizza," the bot may respond with the following: "Which Pizza would you like? (1) Large mushroom pizza like last time, or (2) Another pizza?"

2. Creation/Modification Bot Definition Example

Instead of, or in addition to, the visual application services 244, a developer profile 274 can define a bot through another bot, referred to as a creation/modification bot 242. This can include an initial definition of the bot being created to generate a bot definition 282 and/or a later modification of the bot definition 282.

A creation/modification bot 242 can be defined by its own bot definition 282, although that bot definition may be stored separately from and/or be in a different form from the bot definitions 282 being generated in the bot framework system 230 using the creation/modification bot 242. The creation/modification bot 242 can be run by the runtime engine 250, which can utilize the dialog structures 260, maintain runtime data 265, and interact with developer profiles 274 and/or administrator profiles 276 while running the creation/modification bot 242. Alternatively, the creation/modification bot 242 can be run by a different runtime engine.

As discussed above, the creation/modification bot 242 can receive bot creation data 290, including natural language creation instructions 292, from a developer profile 274 and/or administrator profile 276, and can process and respond to those instructions. For example, the creation/modification bot 242 can respond by sending back responsive textual or audio dialog scripts 262 to the developer profile 274 and/or administrator profile 276 in the course of conversing with the profile in a dialog, such as an audio or textual dialog. The creation/modification bot 242 may interact with the developer profile 274 and/or administrator profile 276 via a messaging service 222, which may transform the dialog scripts 262 and the creation instructions 292, such as by reformatting text or converting between audio speech and text. Also, at least some such reformatting and/or transforming may be performed by the runtime engine 250 and/or the client devices 210.

The dialogs with the creation/modification bots 242 may be conducted using the same components of the bot framework system 230 discussed above for the running of the created bots 252, which can be created using the creation/modification bots 242. Also, the dialogs with the creation/modification bots 242 can be conducted using the same messaging services 222 as for the running created bots 252 created using the creation/modification bots 242.

Following is an example of a dialog that could be conducted between a developer profile 274 and a creation/modification bot 242 for beginning to define a messaging bot for a pizza restaurant. This dialog could be conducted in any of multiple different types of messaging formats, such as a textual chat session, a short messaging service discussion, an audio discussion, an audio-video discussion, etc.

CREATION/MODIFICATION BOT: "HOW CAN I HELP YOU?"
    DEVELOPER PROFILE: "I WANT TO CREATE A BOT?"
    CREATION/MODIFICATION BOT: "WHAT TYPE OF MESSAGING BOT WOULD YOU LIKE TO CREATE? SELECT 1 FOR A BAR BUSINESS BOT, 2 FOR A CATERING BUSINESS BOT, 3 FOR A GROCERY STORE BOT, 4 FOR A PIZZA RESTAURANT BOT, 4 FOR A FLOWER STORE BOT, 5 FOR ADDITIONAL OPTIONS."
    DEVELOPER PROFILE: "PIZZA RESTAURANT BOT."
    CREATION/MODIFICATION BOT: "SELECT A TOPIC TO PROVIDE DETAILS FOR YOUR BOT: 1 FOR ORDER A PIZZA, 2 FOR OPENING HOURS, 3 FOR MENU, 4 FOR LOCATION, 5 FOR PROMOTIONS, 6 FOR PRICING, 7 FOR CONTACT INFORMATION, 8 FOR ADD NEW TOPIC, 9 FOR START OVER, 10 FOR RUN BOT, 11 FOR PUBLISH BOT, OR 12 FOR REPEAT OPTIONS."
    DEVELOPER PROFILE: "2"
    CREATION/MODIFICATION BOT: "DO YOU WANT OPENING TIMES IN 12 HOUR MODE OR 24 HOUR MODE?"
    DEVELOPER PROFILE: "12 HOUR MODE."
    CREATION/MODIFICATION BOT: "WILL THE HOURS YOUR PIZZA RESTAURANT IS OPEN BE THE SAME EVERY DAY?"
    DEVELOPER PROFILE: "NO."
    CREATION/MODIFICATION BOT: "WHICH DAYS WILL HAVE HOURS DIFFERENT FROM YOUR NORMAL HOURS?"
    DEVELOPER PROFILE: "SATURDAY AND SUNDAY."
    CREATION/MODIFICATION BOT: "AT WHAT TIME WILL THE PIZZA RESTAURANT NORMALLY OPEN?"
    DEVELOPER PROFILE: "TEN O'CLOCK."
    CREATION/MODIFICATION BOT: "TEN O'CLOCK AM OR PM?"
    DEVELOPER PROFILE: "AM."
    CREATION/MODIFICATION BOT: "AT WHAT TIME WILL THE PIZZA RESTAURANT NORMALLY CLOSE?"
    DEVELOPER PROFILE: "NINE THIRTY PM."
    CREATION/MODIFICATION BOT: "AT WHAT TIME WILL THE PIZZA RESTAURANT OPEN ON SATURDAY?"
    DEVELOPER PROFILE: "TEN O'CLOCK AM."
    CREATION/MODIFICATION BOT: "AT WHAT TIME WILL THE PIZZA RESTAURANT CLOSE ON SATURDAY?"
    DEVELOPER PROFILE: "TEN O'CLOCK PM."
    CREATION/MODIFICATION BOT: "AT WHAT TIME WILL THE PIZZA RESTAURANT OPEN ON SUNDAY?"
    DEVELOPER PROFILE: "ELEVEN O'CLOCK AM."
    CREATION/MODIFICATION BOT: "AT WHAT TIME WILL THE PIZZA RESTAURANT CLOSE ON SUNDAY?"
    DEVELOPER PROFILE: "TEN O'CLOCK PM."
    CREATION/MODIFICATION BOT: "THE OPENING HOURS ARE DEFINED AS TEN O'CLOCK AM TO NINE-THIRTY PM MONDAY THROUGH FRIDAY, TEN O'CLOCK AM TO TEN O'CLOCK PM ON SATURDAY, AND ELEVEN O'CLOCK AM TO TEN O'CLOCK PM ON SUNDAY. SELECT A TOPIC TO MODIFY OR PROVIDE MORE DETAILS FOR YOUR BOT: 1 FOR ORDER A PIZZA, 2 FOR OPENING HOURS, 3 FOR MENU, 4 FOR LOCATION, 5 FOR PROMOTIONS, 6 FOR PRICING, 7 FOR CONTACT INFORMATION, 8 FOR ADD NEW TOPIC, 9 FOR START OVER, 10 FOR RUN BOT, 11 FOR PUBLISH BOT, OR 12 FOR REPEAT OPTIONS."
    DEVELOPER PROFILE: "RUN BOT."
    CREATION/MODIFICATION BOT: "YOUR BOT WILL NOW RUN. YOU CAN STOP RUNNING

YOUR BOT AND CONTINUE EDITING YOUR BOT AT ANY TIME BY SAYING 'EDIT BOT'."

During this dialog, the creation/modification bot 242 (via the runtime engine 250) can analyze the natural language creation instructions (such as the responses providing times in response to questions about the times, as would occur in a natural language discussion between humans). This analyzing can include determining that the natural language instructions match one or more pre-defined commands to include the one or more messaging bot characteristics in the second messaging bot. For example, each of the times can be matched with a command to include a particular opening or closing time for one or more days in the bot definition for the bot. The creation/modification bot 242 can trigger execution of such commands to begin forming a new bot definition 282 in memory, which may include storing in long term created bot storage 280, and to include the information from the instructions in the new bot definition 282. However, saving of the bot definition 282 in its final form in the created bot storage 280 may wait until the developer profile 274 instructs the creation/modification bot 242 to publish the bot. Such finalizing may also include converting the bot definition 282 into a different form, such as converting the bot definition 282 into executable computer code or into a source code or a scripting programming language. This newly-formed bot definition 282 can be used by the runtime engine 250 to begin running the new running created bot 252 in response to this RUN BOT command As an example, this could result in the following exchange.

RUNNING PIZZA BOT: "HOW CAN I HELP YOU?"
    DEVELOPER PROFILE: "WHAT TIME ARE YOU OPEN TODAY?"
    RUNNING PIZZA BOT: "TEN O'CLOCK AM TO NINE-THIRTY PM."
    DEVELOPER PROFILE: "EDIT BOT"

This EDIT BOT command can be intercepted by the runtime engine 250, and the runtime engine 250 can respond by invoking the creation/modification bot 242 to modify the existing bot definition 282 for the pizza restaurant bot being developed. When this EDIT BOT command is selected while running the bot, the editing may begin with the topic that was the subject of the dialog for the running bot when the EDIT BOT button was selected. This can save time and computing resources in editing the bot. For example, the selection of the EDIT BOT button in the dialog above can result in the following dialog.

CREATION/MODIFICATION BOT: "YOU HAVE ENTERED THE EDITING OF THE OPENING HOURS FOR THE BOT. SAY 'MAIN MENU' AT ANY TIME TO RETURN TO THE MAIN MENU FOR EDITING THE BOT. DO YOU WANT OPENING TIMES IN 12 HOUR MODE OR 24 HOUR MODE?"
    DEVELOPER PROFILE: "24 HOUR MODE."

This conversational messaging dialog between the developer profile 274 on a client device 210 and the bots in the bot framework system 230 (including the creation/modification bot 242 and the running created bot 252 being defined) can continue until the developer profile 274 has provided sufficient creation instructions 292 for a satisfactory bot definition 282, and has provided sufficient runtime instructions 288 to the running created bot 252 to insure the running created bot 252 is conversing correctly with sufficient information, as determined by instructions provided by the developer profile 274.

Additionally, even after the created bot is fully defined and running, a profile 270 conversing with that bot with sufficient privileges (such as an administrator profile 276 or a developer profile 274 for that bot) may be able to edit the bot by providing a specified instruction that is recognized by the runtime engine 250 (such as by saying "EDIT BOT" or by selecting an "EDIT" control button if the messaging with the running created bot 252 is done in a visual environment that supports such a control). Also, the profile 270 may be given the option to choose whether to edit the bot via the visual application services 244 (such as on a Web page) or via a creation/modification bot 242. The profile 270 may be able to perform such editing through different messaging services 222. For example, a single bot definition 282 may be able to be run as a running created bot 252 and interact with multiple different types of messaging services 222, and the creation/modification bot 242 may also be able to use any of those different types of services. Thus, for example, a developer profile 274 that is interacting with a running created bot 252 using SMS can continue using SMS without interruption to edit the definition for that same bot by interacting with the creation/modification bot 242, also using SMS. Similarly, if an administrator profile 276 is interacting with a running created bot 252 using a messaging service 222 that is a computer social network service, the runtime engine 250 will have the communication information (address information, credentials, etc.) to communicate with the administrator profile 276 via that social network service, and can use that communication information to invoke the creation/modification bot 242 to communicate with the administrator profile 276 over that same messaging service 222.

With the bot created, the stored bot definition 282 can be used by the runtime engine 250 in running the running created bot 252. Thus, end user profiles 272 logged in using a client device 210 can converse with the running created bot 252, such as via one or more messaging services 222, as discussed above.

III. Computer Messaging Bot Creation Techniques

Several computer messaging bot creation techniques will now be discussed. Each of these techniques can be performed in a computing environment. For example, each technique may be performed in a computer system that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable memory may have computer-executable instructions embodied thereon that, when executed by at least one processor, cause at least one processor to perform the technique. The techniques discussed below may be performed at least in part by hardware logic.

Figure 9:
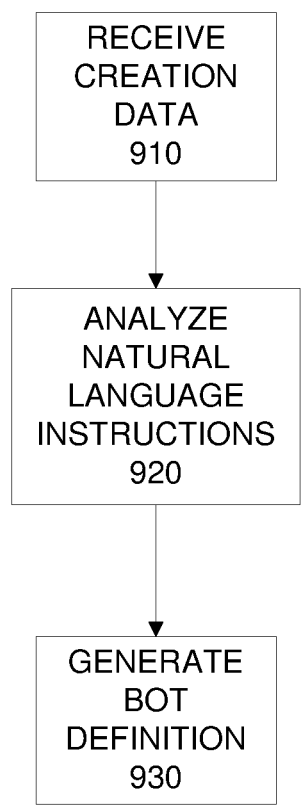
FIG. 9 is a flowchart of a computer messaging bot creation technique.

Referring to FIG. 9, a computer messaging bot creation technique will be discussed. The technique can include receiving 910 computer-readable creation data from a computer-readable developer profile at a first messaging bot. The instructions to create the second messaging bot can include natural language instructions defining one or more messaging bot characteristics. The technique can also include analyzing 920 the natural language instructions. The analyzing 920 can include determining that the natural language instructions match one or more pre-defined commands to include the one or more messaging bot characteristics in the second messaging bot (such as a command to include a particular opening time for a pizza restaurant messaging bot, as discussed in the example above). The technique of FIG. 9 can also include generating 930 a computer-readable definition of the second messaging bot using results of the analyzing of the natural language instructions. The generating of the definition can comprise including computer-readable instructions for the one or more characteristics in the definition, with the definition being configured to produce the one or more characteristics when the second messaging bot is executed using the definition. This basic technique of FIG. 9 can be performed with one or more features of the following paragraphs related to FIG. 9 in any combination with each other.

The technique of FIG. 9 may further include one or more additional acts. For example, the technique may include automatically responding to a portion of the natural language instructions by generating one or more natural language responses and sending the one or more natural language responses to the developer profile, such as sending to the developer profile at a client device. The natural language response(s) can include a natural language request for an additional instruction describing an additional characteristic to be included in the second messaging bot. The natural language instructions can include the requested additional instruction received following the request, and the one or more characteristics can include the additional characteristic.

The technique of FIG. 9 may further include running the second messaging bot in the computer system. This running can include receiving one or more natural language instructions from a computer-readable user profile and responding to the one or more natural language instructions from the user profile by automatically generating and sending one or more natural language responses to the user profile. The generating and sending of the natural language response(s) can be performed in a manner dictated by the instructions for the characteristic(s) in the definition of the second messaging bot.

In the technique of FIG. 9, the definition may be termed an initial definition, and the technique may include additional acts. For example, while running the second messaging bot, the technique may include receiving a command from the user profile to modify the definition. In response to receiving the command (and possibly after also receiving additional input as to the modification), the initial definition can be modified as instructed by the command to produce the modified definition. Also, the technique can include saving a record of an initial dialog between the second messaging bot and the user profile, with the record reflecting the one or more natural language instructions from a computer-readable user profile and the one or more natural language responses using the initial definition. Also, a modified dialog can be generated and sent to the user profile according to the modified definition using the record, with the modified dialog differing from the initial dialog by reflecting the modifying of the definition. The modified dialog may also be presented, such as by displaying or audibly playing the modified dialog.

The computer system can be a bot development computer system (such as the bot framework system 230 discussed above), and the receiving 910 of the creation data from the developer profile can include receiving the creation data via a communication platform computer system (such as a computer system for one of the messaging services 222 discussed above) that is separate from the bot development computer system.

The natural language instruction of the FIG. 9 technique can include coded audio computer data. The analyzing 920 of the instructions can include performing a speech-to-text analysis of the coded audio computer data to produce textual computer data, and analyzing natural language instructions in the textual computer data.

The determining that the natural language instructions match the one or more pre-defined commands can include performing one or more pattern matching operations on the natural language instructions.

Also, the natural language instructions can define one or more general messaging bot characteristics configured to be implemented with a specific dialog structure that defines one or more specific natural language dialog scripts. The technique of FIG. 9 can further include executing the second messaging bot using the definition, with the executing of the second messaging bot including producing the one or more general characteristics, with the producing of the one or more general characteristics comprising receiving one or more natural language instructions from a user profile and responding with the one or more specific natural language dialog scripts as dictated by the specific dialog structure.

Figure 10:
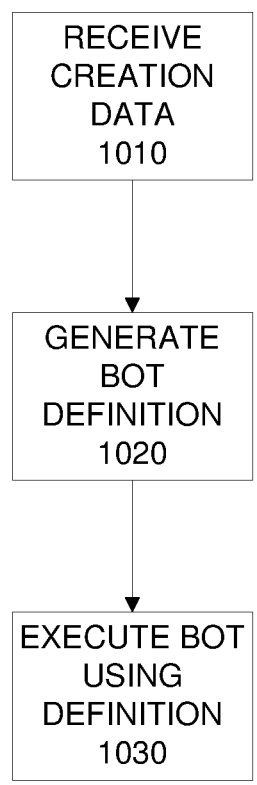
FIG. 10 is a flowchart of another computer messaging bot creation technique.

Referring now to FIG. 10, another computer messaging bot creation technique will be discussed. The technique can include receiving 1010 computer-readable creation data from a computer-readable developer profile. The creation data can include instructions to create a messaging bot, with the instructions not being in a computer programming language, and with the instructions to create the messaging bot defining one or more general messaging bot characteristics configured to be implemented with a specific dialog structure that defines one or more specific natural language dialog scripts. The technique of FIG. 10 can also include generating 1020 a computer-readable definition of the messaging bot using the instructions to create the messaging bot. Further, the technique can include executing 1030 the messaging bot using the definition. The executing of the bot can include producing the one or more general characteristics, and the producing of the one or more general characteristics can include receiving one or more natural language instructions from a user profile and responding with the one or more specific natural language dialog scripts, as dictated by the specific dialog structure. The technique of FIG. 10 can be performed with one or more features of the following paragraphs related to FIG. 10 in any combination with each other.

The technique of FIG. 10 can include presenting a visual display with one or more graphical objects representing the one or more general messaging bot characteristics, and receiving user input at a computer device selecting the one or more graphical objects. Additionally, the technique can include, in response to the user input, generating the computer-readable creation data and sending the computer-readable creation data for use in the generating of the definition of the messaging bot.

The technique of FIG. 10 can be performed without receiving user input from the computer-readable developer profile specifying the specific natural language dialog scripts.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer system comprising:
   at least one processor; and memory comprising instructions stored thereon that when executed by at least one processor cause at least one processor to perform acts comprising:

receiving computer-readable creation data from a computer-readable developer profile, with the creation data comprising instructions to create a messaging bot, and with the instructions to create the messaging bot comprising natural language instructions defining one or more messaging bot characteristics;

analyzing the natural language instructions; and generating a computer-readable definition of the messaging bot using results of the analyzing of the natural language instructions, the generating of the definition comprising including computer-readable instructions for the one or more characteristics in the definition, with the definition being configured to produce the one or more characteristics when the messaging bot is executed using the definition.

2. The computer system of claim 1, wherein the acts further comprise automatically responding to a portion of the natural language instructions by generating one or more natural language responses and sending the one or more natural language responses to the developer profile.

3. The computer system of claim 2, wherein the one or more natural language responses comprise a natural language request for an additional instruction describing an additional characteristic to be included in the messaging bot, wherein the natural language instructions comprise the requested additional instruction received following the request, and wherein the one or more characteristics comprise the additional characteristic.

4. The computer system of claim 1, wherein the acts further comprise running the messaging bot in the computer system, the running of the messaging bot comprising receiving one or more natural language instructions from a computer-readable user profile and responding to the one or more natural language instructions from the user profile by automatically generating and sending one or more natural language responses to the user profile, wherein the generating and sending the one or more natural language responses are performed in a manner dictated by the computer-readable instructions for the one or more characteristics in the definition of the messaging bot.

5. The computer system of claim 4, wherein the definition is an initial definition, and the acts further comprise:

while running the messaging bot, receiving a command from the user profile to modify the definition;

in response to receiving the command, modifying the initial definition as instructed by the command to produce a modified definition; and saving a record of an initial dialog between the messaging bot and the user profile, the record reflecting the one or more natural language instructions from a computer-readable user profile and the one or more natural language responses using the initial definition;

generating a modified dialog according to the modified definition using the record, the modified dialog differing from the initial dialog by reflecting the modifying of the definition; and sending the modified dialog to the user profile.

6. The computer system of claim 1, wherein the computer system is a bot development computer system, wherein receiving of the computer-readable creation data from the computer-readable developer profile comprises receiving of the computer-readable creation data via a communication platform computer system that is separate from the bot development computer system.

7. The computer system of claim 1, wherein the natural language instructions comprise coded audio computer data, and wherein the analyzing of the instructions comprises performing a speech-to-text analysis of the coded audio computer data to produce textual computer data, and analyzing natural language instructions in the textual computer data.

8. The computer system of claim 1, wherein the analyzing of the natural language instructions comprises determining that the natural language instructions match one or more pre-defined commands to include the one or more messaging bot characteristics in the messaging bot.

9. The computer system of claim 8, wherein the determining that the natural language instructions match the one or more pre-defined commands comprises performing one or more pattern matching operations on the natural language instructions.

10. The computer system of claim 1, wherein the natural language instructions define one or more general messaging bot characteristics configured to be implemented with a specific dialog structure that defines one or more specific natural language dialog scripts, and wherein the acts further comprise executing the messaging bot using the definition, with the executing of the messaging bot comprising producing the one or more general characteristics, with the producing of the one or more general characteristics comprising receiving one or more natural language instructions from a user profile and responding with the one or more specific natural language dialog scripts as dictated by the specific dialog structure.

11. A computer-implemented method, comprising:

receiving, via a computer system, computer-readable creation data from a computer-readable developer profile, with the creation data comprising instructions to create a messaging bot, and with the instructions to create the messaging bot comprising natural language instructions defining one or more messaging bot characteristics;

analyzing the natural language instructions; and generating a computer-readable definition of the messaging bot using results of the analyzing of the natural language instructions, the generating of the definition comprising including computer-readable instructions for the one or more characteristics in the definition, with the definition being configured to produce the one or more characteristics when the messaging bot is executed using the definition.

12. The method of claim 11, wherein the method further comprises automatically responding to a portion of the natural language instructions by generating one or more natural language responses and sending the one or more natural language responses to the developer profile.

13. The method of claim 12, wherein the one or more natural language responses comprise a natural language request for an additional instruction describing an additional characteristic to be included in the messaging bot, wherein the natural language instructions comprise the requested additional instruction received following the request, and wherein the one or more characteristics comprise the additional characteristic.

14. The method of claim 11, wherein the method further comprises running the messaging bot, with the running of the messaging bot comprising receiving one or more natural language instructions from a computer-readable user profile and responding to the one or more natural language instructions from the user profile by automatically generating and sending one or more natural language responses to the user profile, wherein the generating and sending the one or more natural language responses are performed in a manner dictated by the computer-readable instructions for the one or more characteristics in the definition of the messaging bot.

15. The method of claim 14, wherein the definition is an initial definition, and the method further comprises:
while running the messaging bot, receiving a command from the user profile to modify the definition;
in response to receiving the command, modifying the initial definition as instructed by the command to produce a modified definition; and
saving a record of an initial dialog between the messaging bot and the user profile, the record reflecting the one or more natural language instructions from a computer-readable user profile and the one or more natural language responses using the initial definition;
generating a modified dialog according to the modified definition using the record, the modified dialog differing from the initial dialog by reflecting the modifying of the definition; and
sending the modified dialog to the user profile.

16. The method of claim 11, wherein the natural language instructions comprise coded audio computer data, and wherein the analyzing of the instructions comprises performing a speech-to-text analysis of the coded audio computer data to produce textual computer data, and analyzing natural language instructions in the textual computer data.

17. The method of claim 11, wherein the natural language instructions define one or more general messaging bot characteristics configured to be implemented with a specific dialog structure that defines one or more specific natural language dialog scripts, and wherein the method further comprises executing the messaging bot using the definition, with the executing of the messaging bot comprising producing the one or more general characteristics, with the producing of the one or more general characteristics comprising receiving one or more natural language instructions from a user profile and responding with the one or more specific natural language dialog scripts as dictated by the specific dialog structure.

18. A computer system comprising:
at least one processor; and
memory comprising instructions stored thereon that when executed by at least one processor cause at least one processor to perform acts comprising:
receiving computer-readable creation data from a computer-readable developer profile, with the creation data comprising instructions to create a messaging bot, with the instructions not being in a computer programming language, and with the instructions to create the messaging bot defining one or more messaging bot characteristics;
generating a computer-readable definition of the messaging bot using the instructions to create the messaging bot; and
executing the messaging bot using the definition, the executing of the bot comprising producing the one or more characteristics, with the producing of the one or more characteristics comprising receiving one or more natural language instructions from a user profile and responding with one or more specific natural language dialog scripts.

19. The computer system of claim 18, wherein the acts further comprise presenting a visual display with one or more graphical objects representing the one or more messaging bot characteristics, receiving user input at a computer device selecting the one or more graphical objects, and in response to the user input, generating the computer-readable creation data and sending the computer-readable creation data for use in the generating of the definition of the messaging bot.

20. The computer system of claim 18, wherein the computer system does not receive user input from the computer-readable developer profile specifying the one or more specific natural language dialog scripts.

\* \* \* \* \*